(No Model.)
E. GRETHER.
MACHINE FOR STRAINING OR REMOVING TENDONS FROM CHOPPED MEAT.
No. 501,417. Patented July 11, 1893.
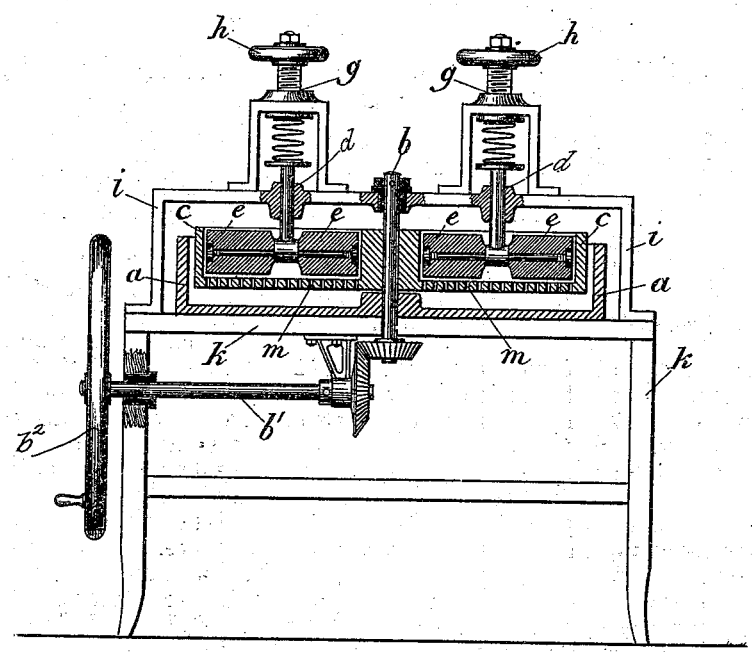
Witnesses:
Geo. W. Rea.
Robert Emmett.
Inventor:
Emil Grether,
By James L. Norris.
atty.

UNITED STATES PATENT OFFICE.

EMIL GRETHER, OF WIESBADEN, GERMANY.

MACHINE FOR STRAINING OR REMOVING TENDONS FROM CHOPPED MEAT.

SPECIFICATION forming part of Letters Patent No. 501,417, dated July 11, 1893.

Application filed January 5, 1893. Serial No. 457,317. (No model.) Patented in Germany September 28, 1890, No. 57,088.

*To all whom it may concern:*

Be it known that I, EMIL GRETHER, of Wiesbaden, in the Kingdom of Prussia and German Empire, have invented a new and useful Improvement in Machines for Straining or Removing the Tendons or Leaders from Chopped Meat and for Straining Fruits, Soups, and other Matters, (for which I obtained a patent in Germany September 28, 1890, No. 57,088,) of which the following is a specification, reference being had therein to the accompanying drawing.

The present invention relates to a machine for straining or removing the tendons or leaders from chopped meat and for straining potatoes, fruit, and other matters.

By the present invention the unpleasant straining in an ordinary strainer or sieve is obviated and the heavy expenses incurred in renewing and repairing the sieves or strainers are avoided by a single outlay for a machine of the present construction, in addition to which the machine works easily and quickly, and at the same time does its work thoroughly.

The accompanying drawing represents a section of the machine, and the straining surface $m$ is made to form the bottom of the inner drum $c$ so as to enable it to be used not only for meat but also for potatoes, fruit and other matters. Rollers $e$ are arranged to run on axes carried by the plungers $d$, which latter are pressed down by springs $f$. The pressure of these springs $f$ is regulated by means of pressure screws $h$, which screw up and down in the supports $g$. All these parts are connected to and supported by the cross bar or frame $i$, which latter is carried by the bed plate $k$. The sieve or strainer drum $c$ is rotated by gearing its vertical shaft $b$ with a horizontal driving-shaft $b'$, which as here shown is provided with a hand-wheel $b^2$ for rotating the driving shaft, and thereby revolving the sieve or strainer drum. The substance contained in the drum $c$ is caused to pass underneath the rollers $e$, which force it through the sieve or straining surface $m$, whence it falls in a finely divided state into the drum $a$, while all residues, such as leaders or tendons, stones, grains, pips and the like, and in short all thick and unbroken particles according to the substance being strained, are retained in the drum $c$.

What I claim, and desire to secure by Letters Patent of the United States, is—

1. The combination of a bed-plate or frame, a stationary drum $a$ supported by the frame, a rotary shaft $b$ extending through the center of the drum, a rotary drum $c$ fixed on the shaft in the stationary drum, and having a bottom sieve or strainer $m$, a series of rollers $e$, having a vertically movable spring-pressed spindle $d$, a frame $i$ supported by the bed-plate or frame, and through which the spring-pressed spindle of the rollers is movable, and means for rotating the center shaft, substantially as described.

2. The combination of a bed-plate or frame, a stationary drum $a$, supported by the latter, a rotary drum $c$ arranged in the stationary drum, and having a bottom sieve or strainer $m$, a cross-bar or frame $i$ extending over the two drums, a roller $e$, provided with a vertical spring-pressed spindle $d$, movable lengthwise through said cross-bar, and means for rotating the rotary drum in the stationary drum, substantially as described.

In witness whereof I have hereunto set my hand in presence of two witnesses.

EMIL GRETHER.

Witnesses:
 ALVESTO S. HOGUE,
 FRANK H. MASON.